United States Patent [19]

Warren

[11] 3,739,969

[45] June 19, 1973

[54] RECORDING WEB TRANSPORT APPARATUS

[75] Inventor: Henry Ray Warren, Indianapolis, Ind.

[73] Assignee: RCA Corporation, New York, N.Y.

[22] Filed: Feb. 25, 1972

[21] Appl. No.: 229,462

[30] Foreign Application Priority Data

Mar. 16, 1971 Great Britain .................... 6,967/71
Mar. 16, 1971 Great Britain .................... 6,971/71

[52] U.S. Cl. ..................... 226/31, 226/40, 226/178
[51] Int. Cl. ........................................ B65h 23/22
[58] Field of Search ............... 226/30, 31, 40, 178, 226/195

[56] References Cited

UNITED STATES PATENTS

| | | | |
|---|---|---|---|
| 2,949,295 | 8/1960 | Huck | 226/40 |
| 2,986,318 | 5/1961 | Tiger | 226/178 |

*Primary Examiner*—Richard A. Schacher
*Attorney*—Edward J. Norton and James B. Hayes

[57] ABSTRACT

A belt drive arrangement for controlled transporting of an elongated recording web. The relative position of the prime mover and a driven member which imparts movement to the web is made controllably variable. The position variation alters the characteristics of belt means utilized to couple the drive to the motion imparting member.

12 Claims, 4 Drawing Figures

RECORDING WEB TRANSPORT APPARATUS

Figure 1:
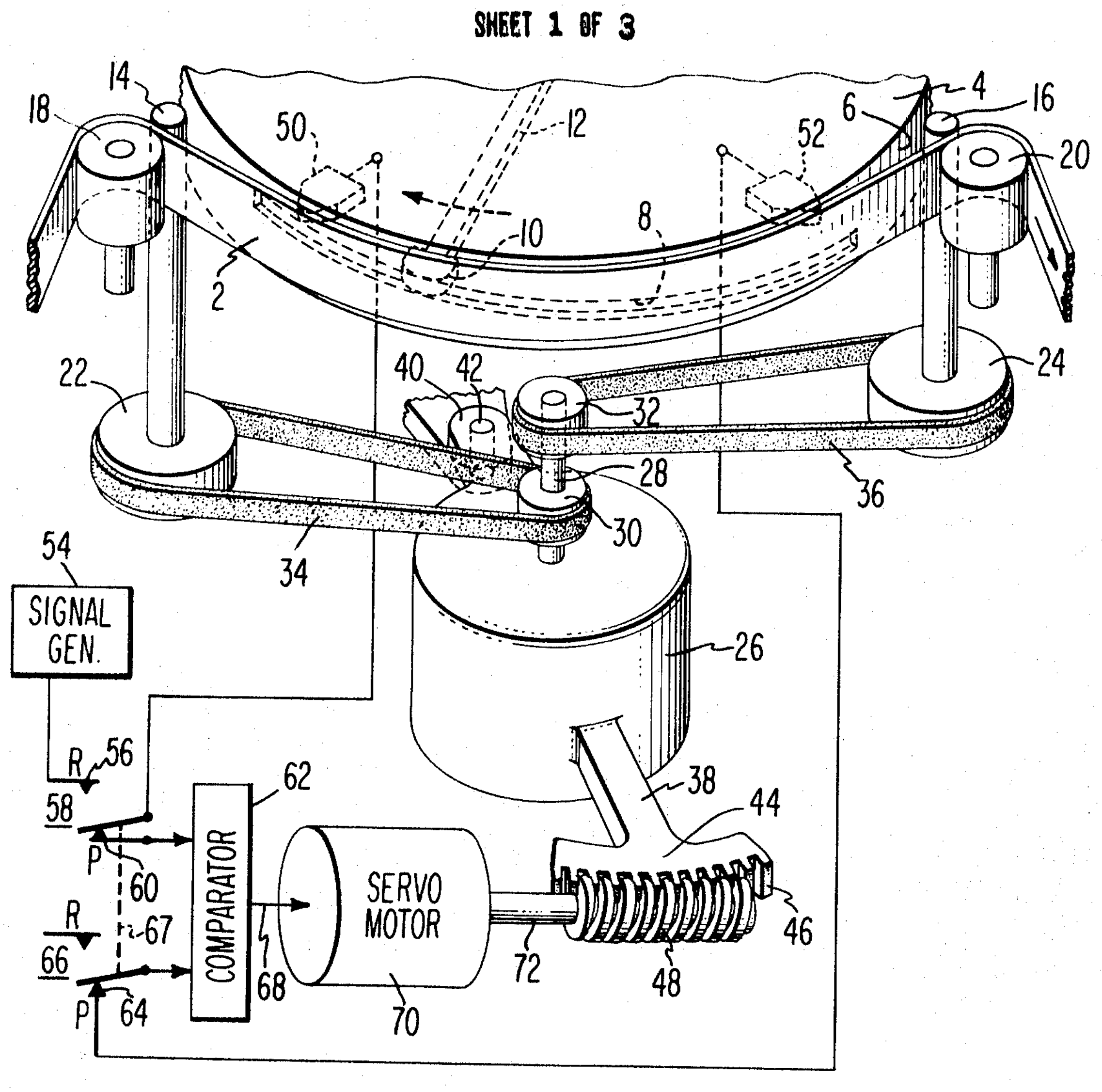

This invention relates to improved systems for controlling the passage of a movable record medium and, to improved control systems for maintaining a desired tension in the medium during its passage over a predetermined path.

Various signal recording and reproducing systems are known in which a magnetic tape or other record medium is made to describe a helical path around the periphery of a structure and in cooperative relation with one or more signal recording-reproducing devices. Such systems are referred to as helical scan recording systems and, in certain applications, as slant track recording systems. The tape may completely incircle the structure so that a tape helix of 360° or more is developed. Alternatively, an open loop is also used with the tape describing a helical path around only a portion of the periphery of the structure. By way of example, tape helices of approximately 270°, 180°, or 90° can be formed in this manner.

The signal recording-reproducing devices, which may be magnetic heads, for example, are made to rotate at constant speed and in a fixed plane at an angle to an axis of the structure around which the tape is driven. In such an arrangement, a helix angle or angle-of-scan exists between the rotating signal recording-reproducing devices and the direction of tape travel. The angle is governed by the width of the tape and by the geometry of the structure supporting the tape. Each signal recording-reproducing device scans diagonally across the width of the tape. By a proper choice of such factors as the number and spacing of the recording devices used, the tape helix angle, tape speed, and the rotating speed of the signal recording-reproducing devices, the signal recording-reproducing devices can be made to scan at a desired angle diagonally from one edge of the tape to the other or over only a given portion of the tape, for example, one-half the width of the tape. A signal fed to the recording-reproducing devices is recorded on, and can be reproduced from, a succession of parallel tracks each usually extending at the same angle across the tape width.

In signal recording systems of the type described above, a preferred tension exists in the record medium as it moves past the signal recording-reproducing devices. In order to properly reproduce a signal from the recorded tracks on the tape, it is necessary that the tension be the same upon reproduction of the signal as it was in recording the signal. If such a condition does not exist upon reproduction, the signal recording-reproducing devices are not properly maintained in alignment with the recorded tracks, preventing completely satisfactory reproduction of the recorded signal. Where such systems are utilized to transduce video information signals, it is particularly important that the track length be exactly the same in playback as it is during recording, so that horizontal displacement of the picture does not occur between successive fields or at the point of switching of the signal recording-reproducing devices.

Various techniques have been proposed for advancing the tape and for maintaining the proper tension by providing, for example, precise, local control over the tape supply and takeup reel motors. While providing a degree of accuracy, the use of such techniques usually results in additional complexity while also being expensive to implement. A drive and control system of simple construction and operation is needed in such systems for automatically and precisely maintaining the same tension and conditions of the tape during reproduction as existed during recording.

In describing the invention, reference will be made to magnetic tape helical scan signal recording and reproducing systems. The invention is not however limited to use in such an application. It can be adapted for use in a wide range of applications using various types of record mediums and arrangements of signal recording-reproducing devices.

As described herein, there is provided apparatus for transporting an elongated recording web. The apparatus includes first and second spaced rotatable shaft means having substantially parallel rotation axes. Means are provided for mounting the first and second shaft means for relative movement thereof transverse of the rotation axes toward and away from each other. Elastic belt means are wrapped about the first and second shaft means for rotational coupling thereof. The belt means has a thickness which varies inversely with the strain of the belt means. Drive means are coupled to at least one of the first and second shafts for providing a substantially constant rotational velocity thereof. The velocity of said belt means is determined by the relative spacing of the first and second shaft means and therefore the resulting thickness of the elastic belt means.

FIG. 1 is a perspective view of an embodiment of the invention.

Figure 2A:
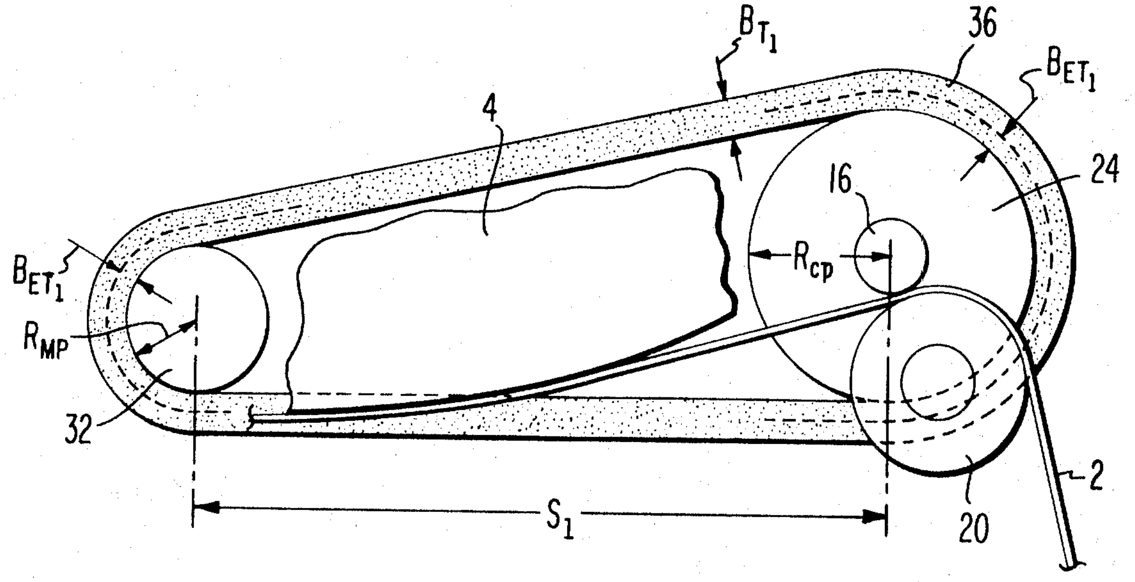
Figure 2B:
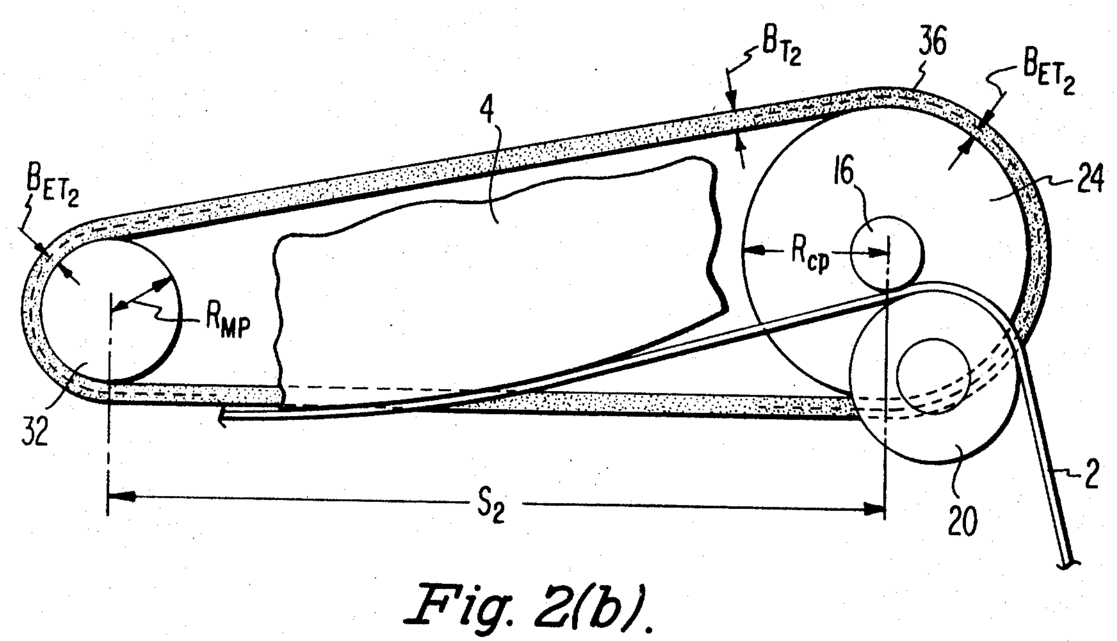

FIGS. 2(*a*) and 2(*b*) are plan views showing in detail a portion of the embodiment of FIG. 1.

Figure 3:
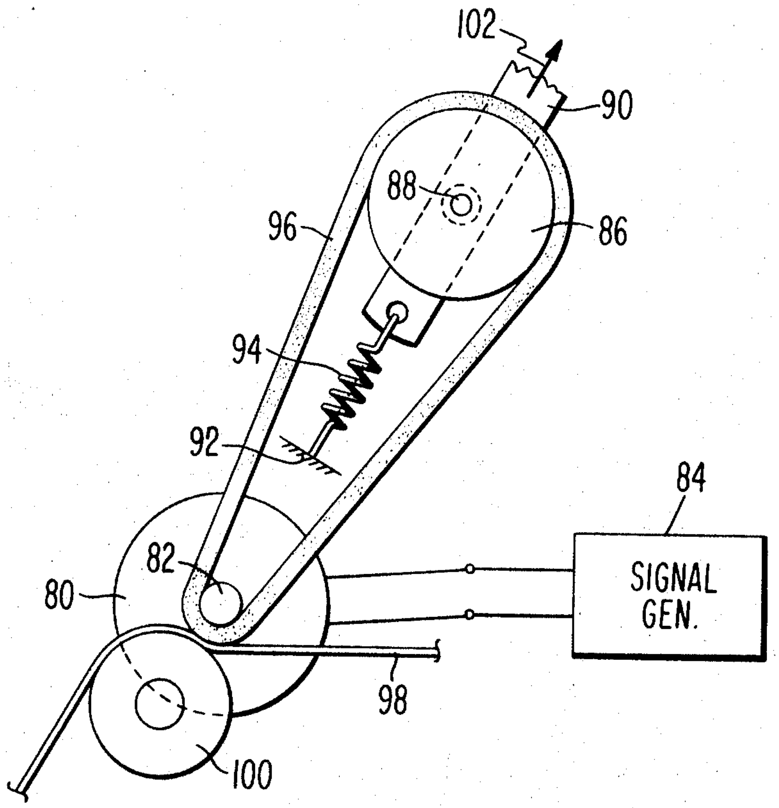

FIG. 3 is a plan view of a further embodiment of the invention.

If reference is made to FIG. 1 there is shown, in simplified form, a recorder-reproducer apparatus for transducing information with an elongated recording web or medium 2. The recording web is transported in cooperative relation with a guide means 4 having a web supporting surface 6. The surface 6 has a slot 8 therein which extends along the surface 6 at an angle with respect to the direction of travel of the recording web 2 over the surface 6. A signal transducing means 10 is mounted by means of an arm 12 for movement through the slot 8 in the surface 6, for transducing information with the recording web 2.

The recording web 2 is transported over the surface 6 by means of a pair of rotatable shafts or capstan members 14 and 16 respectively. In the arrangement shown, the means 14 and 16 are both rotated in the same clockwise or counter-clockwise direction to advance the medium 2 in either direction. The recording medium 2 is urged into cooperative driven relationship with the capstan members 14 and 16 by means of pinch rollers members 18 and 20 respectively. The shaft or capstan member 14 is secured to a pulley means 22 for rotation therewith. The shaft or capstan means 16 is secured to a pulley means 24 for rotation therewith. There is also provided a prime mover such as the motor means 26 which includes a drive shaft 28. Fixedly mounted to the drive shaft 28 for rotation therewith are mounted a pair of further pulley members 30 and 32. Each of the pulley members 30 and 32 are respectively coupled to the pulley means 22 and 24 by the respective elastic belt means 34 and 36.

The belt means 34 and 36 are formed of an elastic material which exhibits the property that the thickness of the belt varies inversely with the strain present in the belt member. For example, the belt means 34 and 36 may be formed of a polyester material such as Mylar or any other suitable material with the above described elastic property.

The prime mover or drive means 26 with the drive shaft 28 are mounted by means of an arm 38 for movement toward and away from the respective pulley members 22 and 24. The end 40 of arm 38 is pivotally mounted for rotation about a fixed pin 42. The end 44 of arm 38 includes a sector gear means 46. The sector gear means 46 is arranged to cooperate with a worm gear 48 for movement of the arm 38 about the pin 42.

Also mounted in the guide means 4 for cooperation with the recording web 2 are a pair of further signal transducing means 50 and 52. The signal transducing means 50 and 52 are arranged to transduce a control type signal on the medium 2, which for example may extend longitudinally along one edge of the medium 2. During the recording mode of the recorder-reproducer apparatus, a control signal from the signal generator 54 is coupled through contact 56 of the switching means 58 to the transducing means 50. The control signal from generator 54 for example may comprise a train of pulses having a given repetition frequency. The relative spacing of the respective signal transducing means 50 and 52 and the repetition frequency of the generator 54 are preferably arranged such that, a pulse on the medium 2 previously recorded by the transducer 50 is opposite the transducer 52 when the transducing means 50 is recording a following control signal pulse on the medium 2. Such an alignment of the control signal with the respective transducers 50 and 52, provides a recorded measure of the tension existing in the medium 2 over the surface 6.

In the playback mode of the recorder-reproducer apparatus, the control signal transduced by the means 50 is coupled through contact 60 of the switching means 58 to the one input of a comparator 62. The portion of the control signal transduced by the means 52 is coupled through contact 64 of a further switching means 66 to a second input of the comparator 62. Switching means 58 and 66 are simultaneously operated by the coupling represented by the dashed line member 67. As indicated the control signal from the medium 2 may be a train of pulses having a given repetition rate.

The comparator 62 may be one of many known types of devices for comparing the timing or phase between the two inputs thereto. The comparator 62 is thus arranged to provide a signal on lead 68 which is a measure of the change or deviation, if any, of the synchronization or alignment of the control signal pulses from the transducing means 50 and 52. The alignment or synchronization of the signals transduced by the means 50 and 52 being a function of the tension of the medium 2, therefore any deviation or change of this relationship from that present during recording is a measure of the amount of change in the tension of the medium 2 between the record and playback modes. The signal on lead 68 is coupled to a servo motor 70. The worm gear means 48 is coupled to the servo motor 70 by means of a shaft 72. Thus the positioning of the arm 38 and therefore the drive shaft 28 is controlled through servo motor 70 in response to the signal on lead 68.

The establishment and control of the tension in the recording web 2 is accomplished through control of the relative velocity of the capstan shaft drive means 14 and 16. As shown and described with respect to FIG. 1, the velocity of each of the capstan means 14 and 16 are derived from the drive shaft 28 through the belt and pulley means previously described. A given amount of tension may be introduced into the recording web 2 by providing one of the capstans, for example capstan means 16, with a higher relative rotational velocity than that of the other capstan means 14. The prime mover means 26 and hence the drive shaft 28 are preferably arranged to provide a constant rotational velocity. Therefore the rotational velocity of the capstan means 14 and 16 are determined respectively by the relative diameters of the pulley means 22, 30, 24, 32 and the belt means 34 and 36. In the embodiment as shown in FIG. 1, the pulley means 22 and 24 are of the same diameter, with pulley means 30 and 32 also being of like diameters, but the pulley means 30 and 32 having a diameter less than that of the pulley means 22 and 24. As previously described, the belts 34 and 36 are of material which exhibits an elastic property such that the thickness of the belt means varies inversely with the degree of strain introduced into the belt means. More particularly, the velocity of the capstan means 14 and 16 is determined by the actual relative radii of the pulley combinations 22, 30 and 24, 32 in conjunction with the effective thickness of the respective belt means 34 and 36.

For purposes of considering the effect of the velocity received from or imparted to a pulley, about which such an elastic belt means such as the means 34 and 36 are disposed, it can be shown that the effective thickness of the belt means in determining velocity, is approximately one-half the actual thickness of the belt means. For an expanded discussion of belt drive principles, see for example, Chapter 14 of "Fundamentals of Mechanical Design" (Third Edition) by Richard M. Phelan. Therefore, the velocity determining radius of a given pulley means is the actual physical radius of the pulley plus one-half the thickness of the belt disposed around the pulley. Since the belt means 34 and 36 as previously mentioned are elastic, the actual thickness of the belt means is determined in accordance with the strain present in the belt means. As shown in the embodiment of FIG. 1, the strain in the belt means 34 and 36 is provided and may be varied by the positioning of the drive shaft 28 and therefore of driving pulleys 30 and 32 with respect to the driven pulleys 22 and 24. That is to say, increasing the distance between the driving and driven pulley members stretches the belt means longitudinally thereby decreasing its cross section and therefore its thickness. Also as indicated, since the driving pulleys and driven pulleys are of unequal radius, the resultant decrease in thickness of the belt means disproportionately changes the velocity determining radii of the driven or capstan pulley and the driving or prime mover pulley.

A more complete understanding of the above described principle will be had from a consideration and the following discussion of FIGS. 2(*a*) and 2(*b*). FIGS. 2(*a*) and (*b*) show in expanded form, details of the drive arrangement for one of the capstan means namely capstan means 16. It will be understood, however, that the arrangement described is applicable to the capstan means 14 also. In FIG. 2(*a*) the pulley 32 is the driving or prime mover motor pulley. The member 24 is the capstan pulley for capstan means 16 which is coupled to the pulley 32 by means of the belt means 36. For purposes of explanation, assume that the capstan pulley 24 has a radius $R_{cp}$ which is equal to 20 inches and the radius of the motor pulley $R_{mp}$ is equal to 10 inches. Assume further that the spacing $S_1$ between the pulleys 24 and 32 is such as to produce a strain in the belt means 36 causing it to have an actual thickness $B_{T1}$ which is equal to 4 inches. For this condition as indicated the effective thickness $B_{ET1}$ of the belt means 36 is therefore approximately equal to 2 inches. Assuming a constant angular velocity for the motor pulley 32, the velocity ratio of the pulleys 24 and 32 may be expressed by the following equation.

$$\frac{R_{cp}+1/2(B_T)}{R_{mp}+1/2(B_T)}=\frac{20+1/2(4)}{10+1/2(4)}=\frac{22}{12}=1.83/1$$

Now in FIG. 2(*b*) for the same actual radii for pulleys 24 and 32 and same rotational velocity of the pulley 32, assume that the spacing between the pulley members 24 and 26 is increased to a value $S_2$. The increased separation $S_2$ between the pulley members 24 and 32, causes an elongation and resultant strain in the belt member 36. For present purposes the separation $S_2$ is assumed to be a value such that the actual belt thickness $B_{T2}$ is now 2 inches and therefore the effective belt thickness $B_{ET2}$ is now approximately 1 inch. The velocity ratio of the pulley members 24 and 32 may again be determined in accordance with the above equation resulting in the ratio as follows:

$$\frac{R_{cp}+1/2(B_T)}{R_{mp}+1/2(B_T)}=\frac{20+1/2(2)}{10+1/2(2)}=\frac{21}{11}=1.92/1$$

From the numerical values obtained from the above equations, it is seen that the altered separation and attendent elongation of the belt means 36, results in an approximately 4 to 5 percent decrease in the velocity of the driven capstan pulley member 24. It will also be understood that, if the separation between the pulleys 24 and 26 is decreased from the initial value, a resultant increase in the velocity of the driven capstan pulley 24 is provided.

Again considering the arrangement of the embodiment shown in FIG. 1, it will be understood that the pivotal arrangement of the prime mover means 26 permits simultaneous variation of the separation between the driving pulleys 30 and 32 and their respective driven pulleys 22 and 24. Thus, with a single adjustment of the position of the driving means, a two fold variation in the resultant relative velocity in the capstan means 14 and 16 is affected, since one of the belt means 34 and 36 will be foreshortened while the other belt means is elongated.

During the recording mode of the recorder-reproducer apparatus of FIG. 1, an initial elongation or strain is established in each of the belt members 34 and 36 to produce the desired differential velocity between the capstan members 14 and 16, and thereby produce a given tension in the recording web 2 over the surface 6. During the playback mode as previously described with respect to FIG. 1, the signal on lead 68, which effectively is monitoring the tension in the web 2, is utilized through the servo motor 70 to control the position of arm 38. The positioning of the arm 38 in turn determines the spacing between the driving and driven pulley members for the capstan members 14 and 16, and thus the tension established during the recording mode is maintained during playback.

If reference is made to FIG. 3, there is shown a further embodiment in accordance with the invention. In FIG. 3 there is provided a prime mover or motor means 80. The motor means 80 has coupled thereto a drive shaft 82. The motor means 80 is energized to produce a constant rotational velocity of the shaft 82 by means of a signal generator 84. There is also provided a pulley member 86 which is mounted for rotation about a fixed shaft 88. The shaft 88 is coupled to a movable arm 90. The arm 90 is resiliently coupled to a mechanical ground 92 by means such as a spring member 94. As shown in FIG. 3, a continuous belt means 96 is disposed about and rotationally couples the pulley member 86 with the driving shaft 82. The belt means 96 is formed of an elastic material and possesses the same characteristics as those shown and described with respect to the belt means of FIGS. 1 and 2. That is, namely, the thickness of the belt means varies inversely with the strain produced in the belt means 96.

In FIG. 3 an elongated recording medium 98 is urged by means such as the pinch roller 100, into contacting relation with the portion of the belt means 96 which is disposed about the drive shaft 82. The contacting relation between the recording web 98 and the belt means 96 results in motion being imparted to the recording web 98. The velocity of movement of the recording web 98 is determined by a driving radius arm which is equal to the actual radius of the shaft 82 plus the actual thickness of the drive belt means 96.

Thus it will be understood that if the arm 90 is moved in a direction of arrow 102 that the distance separating the pulley member 86 and the drive shaft 82 is increased. This increase in separation produces an elongation and hence change in thickness of the belt means 96. The resultant decrease in the thickness of the belt member 96 shortens the drive radius for the recording web 98, thereby decreasing the velocity imparted to the recording web 98. It will be understood of course that a decrease in the distance separating the pulley member 86 and drive shaft 82, produces a corresponding increase in thickness of the belt means 96 and therefore a resultant increase in the velocity imparted to the recording web 98.

Although not shown, the arrangement of FIG. 3 may be utilized in a dual capstan drive recorder-reproducer arrangement such as shown and described with respect to FIG. 1. The arrangement of FIG. 3 would be provided for each of the capstan means 14 and 16 of FIG. 1, with the control arm 102 being coupled by suitable means to a mechanism such as shown and described in FIG. 1, for monitoring the tension in the driven recording web.

In addition in the arrangement of FIG. 3, the members 86 and 82, while shown as having different diameters, may also be of equal diameters. Also the medium 98 may be arranged to be urged into motion imparting cooperation with the portion of the belt means 96 which is disposed about the member 86.

What is claimed is:

1. In a recorder-reproducer system, first and second spaced rotatable shaft means having substantially parallel rotation axes, means mounting said first and second shaft means for relative movement thereof transverse of said rotation axes toward and away from each other, elastic belt means passed about said first and second shaft means for rotational coupling thereof, said belt means having a thickness which varies inversely with the strain in said belt means, drive means coupled to one of said first and second shaft means for providing a controlled rotational velocity thereof, and means by which a record medium can be urged into motion imparting relation with one of said first and second shaft means for movement of said record medium at a velocity determined by the relative spacing of said first and second shaft means and therefore the resulting thickness of said elastic belt means.

2. The combination with a recorder-reproducer system including variable speed apparatus for transporting an elongated record medium, comprising; first and second spaced rotatable shaft means having substantially parallel rotation axes, one of said first and second shaft means adapted to cooperate with said record medium for movement thereof, means mounting said first and second shaft means for relative movement thereof transverse of said rotation axes toward and away from each other, a continuous elastic belt means wrapped about said first and second shaft means for rotational coupling thereof, said belt means having a thickness which varies inversely with the strain in said belt means, drive means coupled to one of said first and second shaft means for providing a substantially constant rotational velocity thereof, and means for urging said record medium into contacting relation with the one of said first and second shaft means adapted to cooperate therewith for movement of said record medium at a velocity determined by the relative spacing of said first and second shaft means and therefore the resulting thickness of said elastic belt means.

3. The combination with a recorder-reproducer system including variable speed apparatus for transporting an elongated record medium, comprising; first and second spaced rotatable shaft means having different diameters and substantially parallel rotation axes, one of said first and second shaft means adapted to cooperate with said record medium for movement thereof, means mounting said first and second shaft means for relative movement thereof transverse of said rotation axes toward and away from each other, a continuous elastic belt means wrapped about said first and second shaft means for rotational coupling thereof, said belt means having a cross-sectional area which varies inversely with the strain in said belt means, drive means coupled to one of said first and second shaft means for providing a substantially constant rotational velocity thereof, and means for urging said record medium into direct contacting relation with the one of said first and second shaft means adapted to cooperate therewith for movement of said record medium at a velocity determined by the relative spacing of said first and second shaft means and therefore the resulting thickness of said elastic belt means.

4. In an apparatus for transporting an elongated recording web in tension between a pair of spaced rotatable web moving means each having a given diameter and shaft means rotatable about an axis intermediate said web moving means with said shaft means having a diameter different from the given diameter of said web moving means, the combination comprising; first and second elastic belt means each coupling said shaft means in substantially non-slipping driving relation with respective ones of said pair of web moving means, each of said belt means having a thickness which varies inversely with the strain of said belt means, and means mounting said shaft means for movement of the rotation axis of said shaft means toward one and away from the other of said web moving means, with the position of said shaft means with respect to said respective web moving means determining the thickness of said first and second belt means and therefore the relative rotational velocity of said web moving means.

5. Apparatus for controlling the tension of an elongated recording web driven thereby, comprising:

drive means;

drive shaft means associated with said driving means with said shaft having a given diameter;

first and second capstan means in spaced relation one to the other and arranged for cooperating with said web;

first and second pulley means each associated with a respective one of said capstan means, with the diameter of said pulley means being different from the diameter of said drive shaft means;

a pair of elastic belt means, each of said elastic belt means being formed of a material whose thickness decreases with increasing strain in said belt means, one of said belt means being wrapped about said drive shaft means and said first pulley means with the other of said belt means wrapped about said drive shaft and said other pulley means, for transmitting from said drive shaft means a substantially non-slipping rotational driving motion in the same given direction to each of said first and second capstans; and means mounting said drive shaft means intermediate said pulley means for selective movement of said drive shaft means in a direction toward one and away from the other of said pulley means.

6. In combination with transport apparatus including a pair of spaced rotatable driving members for transporting an elongated recording web in cooperative relation with signal transducing means disposed therebetween, an arrangement for providing tension control of said web between said driving members comprising; motor means including a driving shaft with a given diameter, means mounting said motor means between said web driving means for movement toward and away from said respective web driving means, first and second pulley means each one of which is coupled to a different one of said web driving means for rotation thereof by said pulley means, said first and second pulleys having a diameter different from said given motor shaft diameter, a pair of elongatable belt means, one of said belt means being disposed about and linking one of said web driving means and said motor shaft, with the other of said belt means being disposed about and linking the other of said web driving means and said motor shaft, and means coupled to said motor mounting means and responsive to a signal applied thereto to position said motor driving shaft toward one and away from the other of said web driving means.

7. The invention according to claim 6 wherein said recording web includes a control signal information track thereon; and further including first and second signal transducing means including output means, said transducing means being mounted in spaced relation between said web driving means for cooperation with said control signal information track, means coupled to said first and second signal transducing means for providing an error signal in response to detected difference between the output thereof, and means coupled to said motor mounting means and responsive to said error signal for establishing the position of said motor means driving shaft with respect to said first and second pulley means.

8. The invention according to claim 6, wherein: said motor mounting means include, means mounting said motor means with the axis of rotation of the driving shaft of said motor means substantially parallel to the axes of rotation of said first and second pulley means and lever means coupled to said motor means for providing pivotal movement of said driving shaft transverse of its rotation axis; and means coupled to said lever means and responsive to said web tension signal for positioning said driving shaft in relative spaced relation with said first and second pulley means.

9. The combination with a recorder-reproducer system including variable speed apparatus for transporting an elongated record medium, comprising; first and second spaced rotatable shaft means having substantially parallel rotation axes, means mounting said first and second shaft means for relative movement thereof transverse of said rotation axes toward and away from each other, elastic belt means wrapped about said first and second shaft means for rotational coupling thereof, said belt means having a thickness which varies inversely with the strain of said belt means, drive means coupled to one of said first and second shafts for providing a substantially constant rotational velocity thereof, and means for urging said record medium into contacting relation with the portion of said belt means wrapped about one of said first and second shaft means for movement of said record medium at a velocity determined by the relative spacing of said first and second shaft means and therefore the resulting thickness of said elastic belt means.

10. The invention according to claim 9, wherein said second shaft means includes rotatable pulley means about which said belt means is disposed, said mounting means for said second shaft means includes a movable arm disposed for movement toward and away from said first shaft means, and means mounting said second shaft means to said arm.

11. The invention according to claim 9, wherein the diameter of said first shaft means is different from the diameter of said second shaft means.

12. The invention according to claim 9, wherein the diameter of said first shaft means is substantially equal to the diameter of said second shaft means.

* * * * *